United States Patent [19]
Kleewein et al.

[11] Patent Number: 6,105,017
[45] Date of Patent: Aug. 15, 2000

[54] METHOD AND APPARATUS FOR DEFERRING LARGE OBJECT RETRIEVALS FROM A REMOTE DATABASE IN A HETEROGENEOUS DATABASE SYSTEM

[75] Inventors: James Charles Kleewein; Eileen Tien Lin; Hemant Maheshwari; Tina Louise Mukai, all of San Jose; Steven John Watts, Morgan Hill, all of Calif.

[73] Assignee: International Business Machines Corporation, Armonk, N.Y.

[21] Appl. No.: 08/929,642

[22] Filed: Sep. 15, 1997

[51] Int. Cl.[7] .................................................... G06F 17/30
[52] U.S. Cl. .................................................. 707/2; 707/10
[58] Field of Search ............................................. 707/2, 10

[56] References Cited

U.S. PATENT DOCUMENTS

| | | |
|---|---|---|
| 5,794,250 | 8/1998 | Carino, Jr. et al. .................. 707/104 |
| 5,864,843 | 1/1999 | Carino, Jr. et al. ...................... 707/4 |

OTHER PUBLICATIONS

Stonebraker, M. and Olson M. "Large Object Support in Postgres", Ninth International Conference on Data Engineering, Apr. 1993, pp. 355–362.

*Primary Examiner*—Jack M. Choules
*Attorney, Agent, or Firm*—Ohlandt, Greeley, Ruggiero & Perie L.L.P.

[57] ABSTRACT

A database management method enables an improved efficiency processing action in a computer wherein manipulation of data from a table is required in accord with a query request, wherein the table is stored remotely from said computer and at least some data in the table includes large data objects (LOBs). The method includes the steps of: responding to the request by transmitting a query to the table; configuring a result set from the table in response to the query, wherein the result set includes one or more unique identifiers of any LOB data associated with the result set; receiving the result set and performing a data manipulation action on data contained in the result set to form a response; transferring the response to the query requester; and accessing LOB data from the table that is referenced by the one or more unique identifiers in the result set and causing transfer of the LOB data to the query requester.

12 Claims, 4 Drawing Sheets

O_EMPLOYEE

| ROW # | EMPNUM | EMPNAME | PICTURE |
|---|---|---|---|
| 1 | 101 | TOM | <1 MB> |
| 2 | 102 | JACK | <0.8 MB> |
| 3 | 103 | JILL | <2 MB> |
| 4 | 104 | JEAN | <1.5 MB> |
| 5 | 105 | BILL | <50 MB> |

<1.5 MB> DENOTES AN IMAGE FILE OF 1.5 MB

FIG.3

S_SALARY

| EMPNUM | SALARY |
|---|---|
| 101 | 100000.00 |
| 102 | 39000.00 |
| 103 | 60000.00 |
| 104 | 40000.00 |
| 105 | 150000.00 |

FIG.4

METHOD AND APPARATUS FOR DEFERRING LARGE OBJECT RETRIEVALS FROM A REMOTE DATABASE IN A HETEROGENEOUS DATABASE SYSTEM

CROSS-REFERENCE TO RELATED PATENT APPLICATIONS

This Application is related to the following co-pending patent applications:

"HETEROGENEOUS DATABASE SYSTEM WITH DATA SOURCE EXTENSIBILITY", Inventor(s): Kleewein et al., U.S. Ser. No. 08/929,809 now U.S. Pat. No. 5,920,016;

"SYSTEM AND METHOD FOR PROVIDING A SINGLE APPLICATION PROGRAM INTERFACE FOR HETEROGENEOUS DATABASES", Inventor(s): Kleewein et al., U.S. Ser. No. 08/931,008 now U.S. Pat. No. 6,009,428;

"METHOD AN APPARATUS FOR OPTIMIZING QUERIES ACROSS HETEROGENEOUS DATA BASES", Inventor(s): Kleewein et al., U.S. Ser. No. 08/929,877 now U.S. Pat. No. 5,943,666;

"METHOD AND APPARATUS FOR OPTIMIZING A MERGE-JOIN OPERATION ACROSS HETEROGENEOUS DATABASES", Inventor(s): Kleewein et al., U.S. Ser. No. 08/931,404 now U.S. Pat. No. 5,903,893;

"METHOD AND APPARATUS FOR CACHING RESULT SETS FROM QUERIES TO A REMOTE DATABASE IN A HETEROGENEOUS DATABASE SYSTEM", Inventor(s): Kleewein et al., U.S. Ser. No. 08/931,003 now U.S. Pat. No. 5,903,887;

"HETEROGENEOUS DATABASE SYSTEM WITH DYNAMIC COMMIT PROCEDURE CONTROL" Inventor(s): Kleewein et al., U.S. Ser. No. 08/931,029 now U.S. Pat. No. 5,953,719; and "METHOD AND APPARATUS FOR ACCESSING OF LARGE OBJECT DATA SEGMENTS FROM A REMOTE DATABASE", Inventor(s): Maheshwari et al., U.S. Ser. No. 08/931,002 now U.S. Pat. No. 5,920,860.

FIELD OF THE INVENTION

This invention relates to an application program interface which provides transparent access to heterogeneous databases and, more particularly, to such an interface which provides an improved efficiency data manipulation operation by deferring large object (LOB) retrievals from a remote database.

BACKGROUND OF THE INVENTION

A continuing demand exists to couple multiple databases so as to enable transparent access to data stored therein. "Transparent" implies that an application program at a specific site is able to access data from all connected databases, without being aware of the origin of the data, nor of any incompatibilities which might exist between a local database and any of the plurality of coupled remote databases. It is to be understood that the terms "remote" and "local", as used herein, not only refer to physical locations, but also to databases that are located at a single site (e.g. on one or more computers), but are controlled by different operating systems or database protocols.

In order to provide a transparent interface for heterogeneous databases, the prior art has employed one database as an interface and has enabled that interface, under control of a database management system (DBMS), to access data from other databases in accordance with data entries contained in an interface table.

Upon receiving a query, the receiving DBMS performs a query optimization procedure to decide upon an efficient method for accessing the requested data. During such an optimization action, the specific data manipulation required to respond to the query is examined and various alternatives methods for deriving a query response are evaluated. During such an optimization action, various types of join methods may be considered. A join method is used when rows from an "outer" table are concatenated to rows of one or more other tables (i.e., "inner" tables), in accord with a determined criteria. A "table" as used herein is any tabular presentation of data. An outer table is one from which a search name is retrieved from a "joining column". An inner table is one from which data is retrieved, based on the search name retrieved from the joining column. The joining column is the column in the outer table which includes the data or search names that are utilized when accessing data in the inner table. The data retrieved from the inner table and/or the outer table, in answer to a received query, is termed the "result set".

Relational DBMS's use SQL (structured query language) as a standard language for enabling database manipulations. The SQL language allows users to formulate relational operations on the database tables. For example, each SQL operator operates on either one or two tables and produces a new table as a result. SQL enables the linking together of information from multiple tables or views to perform complex sets of procedures. One of those procedures is a join of columns of data from two or more tables.

Typically, a relational database stores a single data value entirely within a single storage unit whose size is prescribed by the database architecture. To provide greater limits on the data values stored, some relational database management systems include a specially defined datatype called a large object, generally referred to as a LOB. Recently, databases permit LOBs to have data sizes on the order of plural gigabytes ($10^6$KB). Because of their size, transfers of LOB data values can require potentially many disk drive access operations that can significantly impede data manipulations and incur a severe performance penalty. Such a penalty exists even if a relatively minor use is made of a LOB. Currently, LOBs are experienced when full color image data is included as part of a database table.

The prior art has handled and manipulated LOBs using a technique called "deferred evaluation" that links data structures together. In deferred evaluation, the evaluation of predetermined string operators in an assignment statement is deferred until the entire assignment statement is received, rather than the more typical action of immediately executing string operators as they are encountered. Typically, a data structure is created for each operand of an assignment statement and includes a specification of what string operations are to be performed. The database management system analyzes the data structures and the string operations and delays actually retrieving any data values from the data base until string operations have been simplified. That is, intermediate results are not written back to the database disk if they can be used for a next string operation. In such manner, disk access operations are reduced.

In U.S. Pat. No. 5,566,323 to Gainer et al., assigned to the same Assignee as this application, a relational DBMS is described which stores and retrieves LOBs. The Gainer et al.

disclosed DBMS "mutates" selected string operations on LOBs into equivalent functions requiring reduced storage access operations. When a LOB is encountered, the DBMS first checks to determine if the statement can be "mutated". A "mutateable" statement is an assignment statement having at least one string operation and operands, such that the string operator can be changed or mutated into an equivalent function on a LOB operand that can be left in the database, thereby eliminating associated storage access operations. That is, the mutated function does not require that the LOB be read from the database into intermediate storage, but instead provides an equivalent string result by operating on the LOB, in place, in the database storage. The mutated statement is then processed according to the above-described deferred evaluation scheme.

When LOBs are encountered in heterogeneous database systems, transfers of LOBs from remote database tables are often required to respond to a query from an application program. Such LOB transfers can impose a significant communication cost on the heterogenous database system and are to be minimized, if at all possible.

Accordingly, it is an object of this invention to provide a method and apparatus for improving the efficiency of handling of LOB transfers in a heterogenous database system.

It is another object of this invention to provide a system and method for deferring LOB transfers when preparing a response to a query from an application program.

SUMMARY OF THE INVENTION

A database management method enables an improved efficiency processing action in a computer wherein manipulation of data from a table is required in accord with a query request, wherein the table is stored remotely from said computer and at least some data in the table includes large data objects (LOBs). The method includes the steps of: responding to the request by transmitting a query to the table; configuring a result set from the table in response to the query, wherein the result set includes one or more unique identifiers of any LOB data associated with the result set; receiving the result set and performing a data manipulation action on data contained in the result set to form a response; transferring the response to the query requester; and accessing LOB data from the table that is referenced by the one or more unique identifiers in the result set and causing transfer of the LOB data to the query requestor.

BRIEF DESCRIPTION OF THE DRAWINGS

FIG. 3 illustrates an inner table and is utilized as an example in describing the operation of the invention.

FIG. 4 illustrates an outer table and is utilized as an example in describing the operation of the invention.

DETAILED DESCRIPTION OF THE INVENTION

Figure 1:
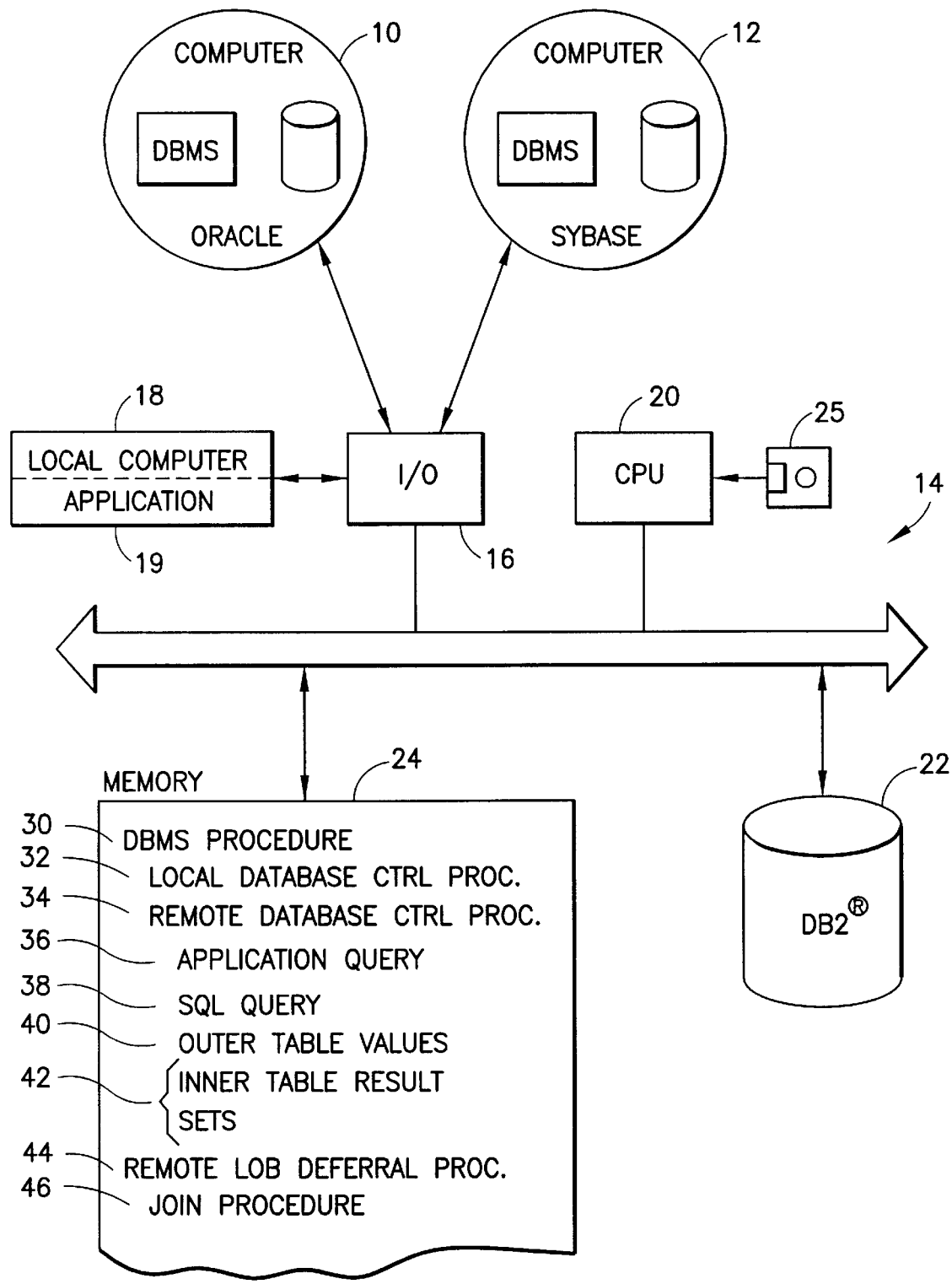
FIG. 1 is a high level block diagram of a database system which incorporates the invention.

Referring to FIG. 1, a heterogeneous database system includes, for example, three separate database management systems (DBMS's). A computer 10 includes an Oracle DBMS, a computer 12 includes a Sybase DBMS, and a computer/server 14 includes a DB2 DBMS. (Oracle is a trademark of the Oracle Corporation, Sybase is a trademark of the Sybase Corporation, and IBM and DB2 are trademarks of the International Business Machines Corporation). Computer/server 14 includes an input/output (I/O) module 16 which enables communication with computers 10 and 12 and various local computers 18, etc.

As will be hereafter understood, an application program 19 running on local computer 18 is able to access data from any connected database, whether the data is housed in computers 10, 12 or 14, and at all times it appears to application program 19 as though the data is coming from computer/server 14. A central processing unit (CPU) 20, a disk file 22 where the data comprising the DB2 database is stored and a memory 24 are all contained within computer/server 14. Within memory 24 are a plurality of procedures which provide overall control of the DB2 database and enable transparent access to and from the Oracle and Sybase databases in computers 10 and 12. Each of the aforesaid databases can be accessed by a standard data access language, such as SQL.

While the procedures to be considered below which enable implementation of the invention are shown in FIG. 1 as already loaded into memory 24, it is to be understood those procedures can be loaded into CPU 20 via a memory disk, tape or other storage device 25 in the well known manner. In any of these cases, the operation of CPU 20, in carrying out the functions of the invention, are controlled by the procedures and data stored in either memory 24 or storage device 25.

It is to be understood that the invention to be described below is applicable to many different types of data query actions, wherein a remotely located table is involved which includes LOB data. Thus, if a query from application program 29 includes a value which is to be used to access data from a remote table, and the data in the table includes one or more LOBs, transfer of the LOBs may be deferred in accord with the invention. To describe the invention, an exemplary application program query will be described wherein a join data manipulation action is required. Application of the invention to other data manipulation actions will thereafter be clear to those skilled in the art.

Memory 24 schematically illustrates some of the entries stored therein. DBMS procedure 30 includes local database control procedure 32 and remote database control procedure 34. Local database control procedure 32 is, for instance, responsive to a request from application program 19 running on local computer 18, to retrieve requested data from the DB2 database stored on disk file 22. Remote database control procedure 34 performs the same function, but with respect to the Oracle and Sybase databases contained on computers 10 and 12, respectively. In all cases, the functioning of procedures 32 and 34 are transparent to application program 19.

Memory 24 further includes a number of sub-procedures which are utilized to carry out the invention. In specific, remote database control procedure (hereafter RDCP) 34 stores an application query 36 received from application program 19. RDCP 34 further responds to receipt of application query 36 by establishing an SQL query 38 to a remote database wherein data is stored which is required to respond to application query 36. A further section of memory 24 includes outer table values 40 which are retrieved from either a locally stored outer table or from a remotely stored outer table, such as one stored in computer 10 (Oracle database). Memory 24 further includes a region for storing inner table result sets 42 that are returned in response to each SQL query 38 and a remote LOB deferral procedure 44, to be described in detail below. A join procedure 44 (i.e., an example of a data manipulation procedure) is also included within memory 24 and operates upon inner table result sets 42 and outer table values 40 to produce a result which is responsive application query 36.

As will be understood, an outer table or an inner table required to be accessed in response to application query 36 may include a column or columns including LOBs. Such a fact can be determined by RDCP 34 inquiring into statistical data contained in the DBMS which manages the table from which data will be accessed to respond to application query 36. If it is found that a column datatype specification is of a LOB category (e.g., data entries therein exceed a data size threshold value), then remote LOB deferral procedure 44 is invoked by RDCP 34.

Figure 2A:
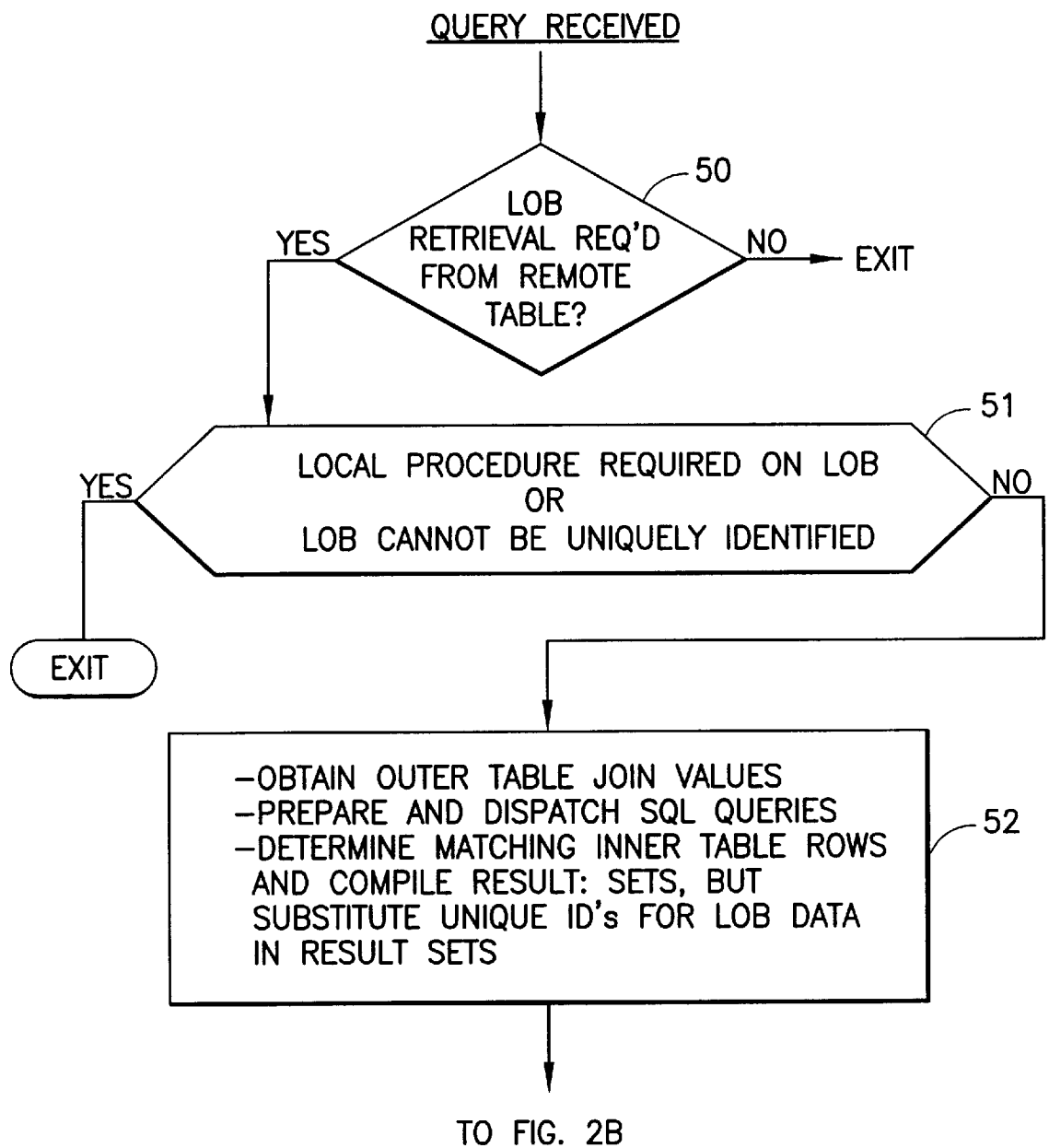
FIGS. 2A and 2B illustrate a logical flow diagram which describes the operation of the method of the invention.
Figure 2B:
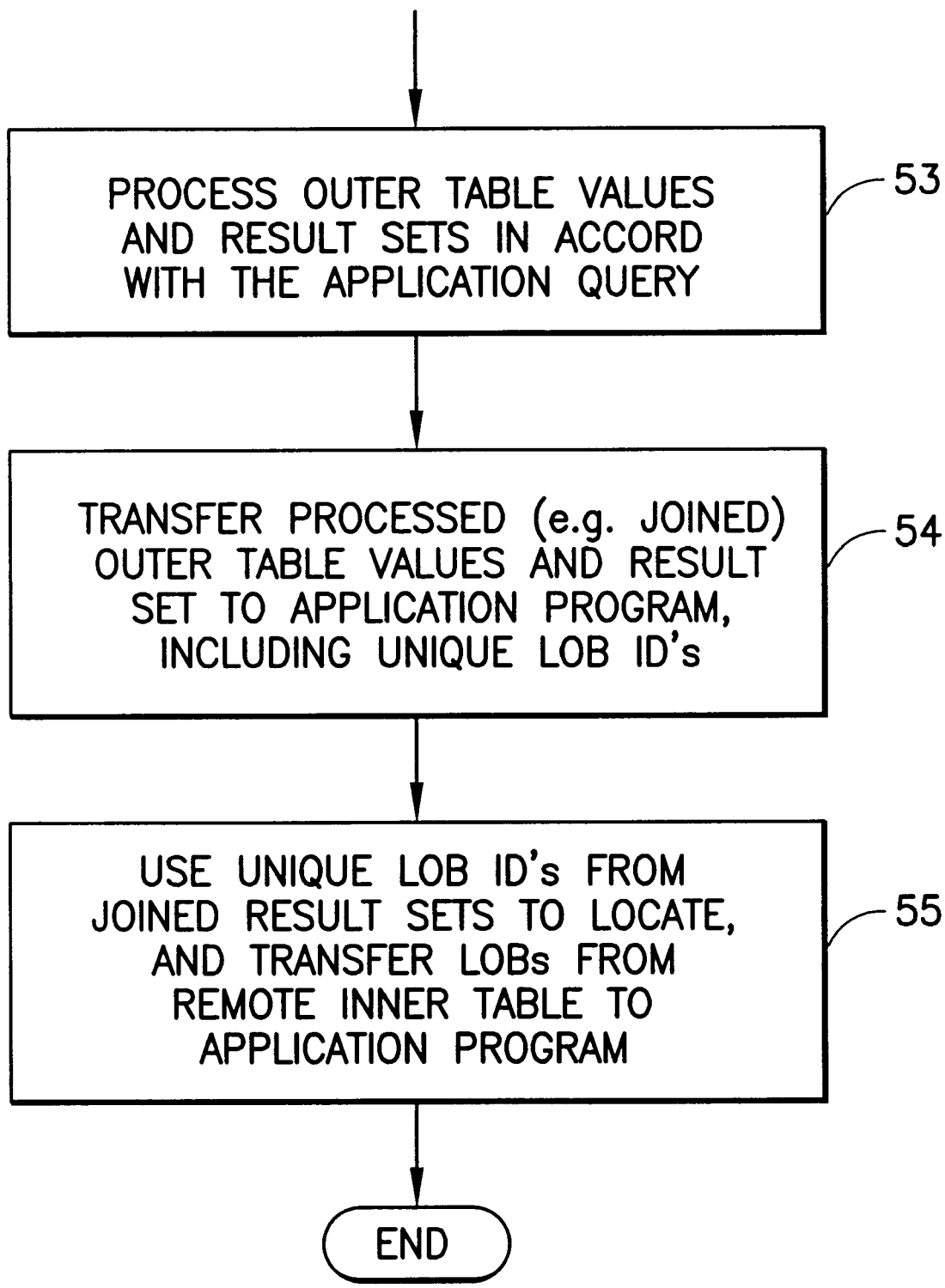

Referring now to FIGS. 2A and 2B, a high level logic flow diagram of the method of the invention will be considered, followed by a detailed example, using the tables shown in FIGS. 3 and 4. Hereafter it will be assumed that: (i) an inner table required to be accessed to respond to an application program query includes a LOB column and (ii) that a data manipulation action to be performed on data from outer and inner tables is a join action. It is to be understood that if an outer table (as contrasted to the inner table in the example below), includes a LOB column, that the LOB data values may be handled in the same manner as to be described for the inner table. More specifically, if the LOB data does not need to be locally processed during the join or other data manipulation action, the LOB data can be replaced by a unique identifier which, after the join action, is used to access the LOB data for transfer to the Application program, Initially, application query 36 is received from application program 19. RDCP 34, after determining that a remote inner table access action will be required and that the remote inner table includes LOBs (decision box 50), next determines whether any local database functions (i.e., on computer/server 14) are to be applied to the LOBs which are remotely stored in the inner table (decision box 52). Further, RDCP 34 determines if the LOBS in the remote inner table cannot be uniquely identified, i.e., either by a row ID or a by a unique index.

If no local processing or use is required of LOBs and the LOBS can be uniquely identified, LOB transfer can be deferred. Otherwise, the LOBs must be transferred to RDCP 34 during the access process.

Assuming LOB transfer can be deferred, (i) values to be joined are obtained from the outer table; (ii) SQL queries 38 are prepared for dispatch to the inner table which include the outer table values; and the SQL queries 38 are transmitted to the inner table (box 52). Result sets from matching rows in the inner table are determined and are returned as inner table result sets 42 for storage in memory 24. However, in lieu of the LOB data present in the matching rows, unique identifiers for corresponding LOBs are substituted in the result sets instead of the actual LOB data. Accordingly, each result set includes not only the matching data from an inner table row, but a unique identifier which essentially serves as an index to the corresponding LOB data, during a later access and transfer.

Once all of the matching result sets have been retrieved from the inner table (in response to SQL queries 38), and the inner table result sets 42 are stored in memory 24, the required processing of outer table values 40 and inner table result sets is performed (box 53). In this example, join procedure 46 is invoked by remote LOB deferral procedure 44 to perform the join action required to respond to application query 36. More specifically, each outer table value is joined with each corresponding inner table result set, it being remembered that each inner table result set includes a unique identifier for the LOB data rather than the inner table LOB data per se.

Thereafter (box 54), the joined outer table values/inner table result sets are transferred to application program 19. Remote LOB deferral procedure 44 then accesses each of the unique identifiers in each joined inner table result set and retrieves the respectively identified LOB data from the inner table (box 55). The LOB data from the inner table is then directly transferred to application program 19, enabling application program 19 to process the query response data using the actual LOB data. It is preferred that the LOB data be transferred to a file in application program 19 via a streaming action, directly from the remote inner table without a buffering of the LOB data in memory 24.

Turning now to FIGS. 3 and 4, an example will further illustrate the method of the invention. Assume that the table shown in FIG. 3, i.e., O_Employee, is the inner table and is stored in the Oracle database on computer 10, and that the table shown in FIG. 4, i.e., S_Salary is the outer table that is stored in Sybase database in computer 12. Assume that application/server 14 is required to access inner table values from computer 10 and to join such values with the outer table stored on computer 12. Note that table O_Employee includes a picture column wherein each row thereof includes a LOB (e.g., a data size in excess of 32 KB, for instance). Further assume that application program 19 issues a query which requests the name and picture of each employee whose salary is less than $50,000.

Accordingly, RDCP 34, for example, institutes an optimizing action which determines that a merge-join action is required to respond to the query. It further determines that the employee name and picture data is held in the O_Employee table in computer 10 and that the salary data is held in the S_Salary table stored in computer 12. RDCP 34 then accesses statistics from the respective databases containing the tables of interest and determines that inner table O_Employee includes a data column that stores LOB data. Accordingly, RDCP 34 invokes remote LOB deferral procedure 44

Remote LOB deferral procedure 44 then retrieves from inner table 0_Employee, columns empNum and empName and a "remote locater" value, which in this case is the row number, but does not retrieve the Picture column. It also retrieves from outer table S_Salary, the empNum column of entry having a Salary entry less than $50,000. Join procedure 56 is then executed between the imported column values of the inner and outer tables and the result set of the action is as follows:

| empName | Salary | Picture |
| --- | --- | --- |
| Jack | 39000.00 | Row 2 |
| Jean | 40000.00 | Row 4 |

Thereafter, when DBMS procedure 30 transfers the result set to application program 19, it uses the "remote locators" i.e., the row identifiers, to access the corresponding LOB values the 0_Employee table and a transfer thereof occurs directly from computer 12 to the application space utilized by application program 19 (which can be a memory buffer or file) If it is a file, then the remote LOB column values are streamed directly from the table on computer 12 to the application file, without being stored to disk in computer/server 14.

As a further example, application program 19 might issue a query which results in the following SQL query being issued to the O_Employee table of FIG. 3:
Select picture, empNum from O_Employee where empName='Tom', Assume that a decision is made to evaluate the predicate locally. In other words, the table O_Employee rows are imported into computer/server 14 to perform the desired data manipulation. In such case, all rows are initially fetched, including the row identifiers, but the LOB column data is left in place. The predicate is then applied to the retrieved rows which produces a result set of row #1. At this time the row identifier is used to fetch the picture column data from row #1. Thus deferred LOB retrieval saves both processing and I/O operations which would be required if all the LOB data had been imported.

The results of the above operation are that communication costs are saved and the number of disk input/outputs are substantially reduced. Given the relatively large size of the LOBs, such savings can potentially be significant.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for enabling a processing action in a computer which requires a manipulation of large object data (LOB) from a table in accord with a query request, wherein said table is stored remotely, said method comprising the steps of:

a) determining if a data manipulation of said LOB data is required to respond to said query request and, if not, responding to said query request by transmitting a database query to a database management system (DBMS) which controls the table;

b) enabling said DBMS to configure a result set from said table in response to said database query, which result set includes one or more unique identifiers for said LOB data associated with said result set;

c) receiving said result set and performing a data manipulation action on data contained in said result set to form a query response;

d) transferring said query response to said query requestor; and e) accessing said LOB data from said table that is referenced by said one or more unique identifiers in said query response and causing transfer of said LOB data to said query requester.

2. The method as recited in claim 1, wherein said method is implemented by a processor which incorporates a DBMS and steps a)–e) are performed only if said LOB data is able to be identified by a unique identifier.

3. The method as recited in claim 1, wherein step e) causes a transfer of said LOB data directly to memory utilized by said query requester.

4. The method as recited in claim 1, wherein prior to step a), said computer performs the follow initial step:

determining if said query response will comprise only a subset of the result set, and only if yes, performing steps a)–e).

5. A method for enabling a processing action which requires a join of data from a first table and data from a second table, wherein said second table is stored remotely from said first table, and wherein data from at least one said table includes large object (LOB) data, said method comprising the steps of:

a) determining if a data manipulation of said LOB data is required to perform said join and, if not, responding to a query from a query requester by obtaining a value from the first table and transmitting a query to a database management system (DBMS) controlling the second table to enable the DBMS to access matching data for said value, said matching data associated with said LOB data;

b) configuring a result set corresponding to said matching data from said second table, which result set includes one or more unique identifiers for any said LOB data associated with said result set;

c) receiving said result set and performing a join procedure to form a query response;

d) transferring said query response to said query requester; and e) accessing said LOB data from said second table that is referenced by said one or more unique identifiers in said query response and causing transfer of said LOB data to said query requester.

6. The method as recited in claim 5, wherein said method is implemented by a processor which incorporates a DBMS and steps a)–e) are performed only if said LOB data is able to be identified by a unique identifier.

7. The method as recited in claim 5, wherein step e) causes a transfer of said LOB data directly to memory utilized by said query requester.

8. The method as recited in claim 5, wherein prior to step a), said method includes the following initial step:

determining if said query response will comprise only a subset of the result set, and only if yes, performing steps a)–e).

9. A memory media for controlling a processing action in a computer which requires a manipulation of large object (LOB) data from a table in accord with a query request, wherein said table is stored remotely, said memory media comprising:

a) means for controlling said processing action to determine if a data manipulation of said LOB data is required to respond to said query request and, if not, to respond to said query request by transmitting a database query to a database management system (DBMS) which controls the table, so as to enable said DBMS to configure a result set from said table in response to said database query, which result set includes one or more unique identifiers for said LOB data associated with said result set;

b) means for controlling said processing action to receive said result set and to perform a data manipulation action on data contained in said result set so as to form a query response;

c) means for controlling said processing action to transfer said query response to said query requester; and d) means for controlling said processing action to access said LOB data from said table that is referenced by said one or more unique identifiers in said query response and to cause transfer of said LOB data to said query requestor.

10. The method as recited in claim 9, wherein said means a)–d) are operative only if said LOB data is able to be identified by a unique identifier.

11. The memory media as recited in claim 9, wherein means d) causes a transfer of said LOB data directly to memory utilized by said query requester.

12. The memory media as recited in claim 9, wherein prior to operation of means a)–d), said processing action is controlled to determine if said query response will comprise only a subset of the result set, and only if yes, enabling operation of means a)–d).

* * * * *